Figure 1:
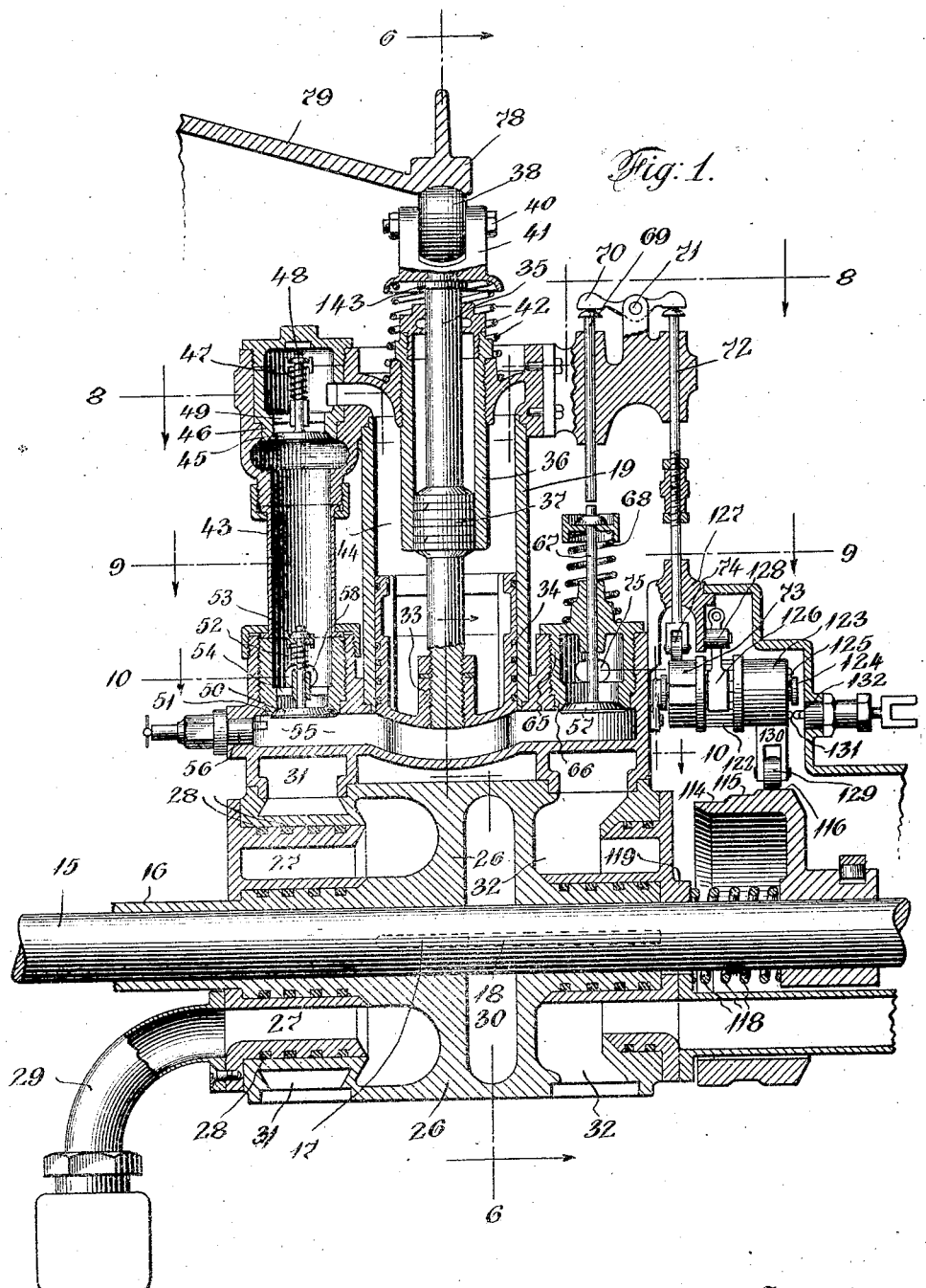

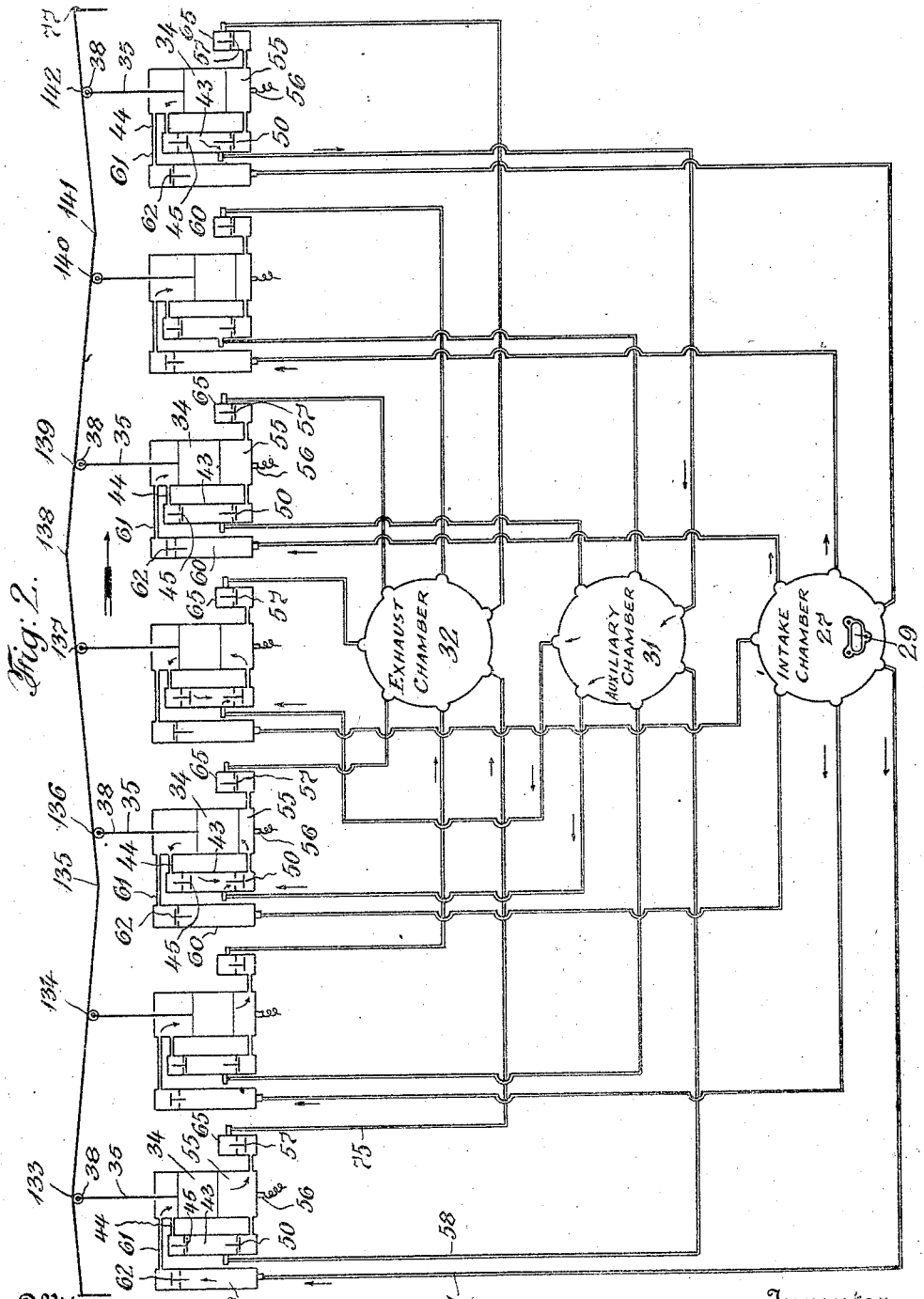

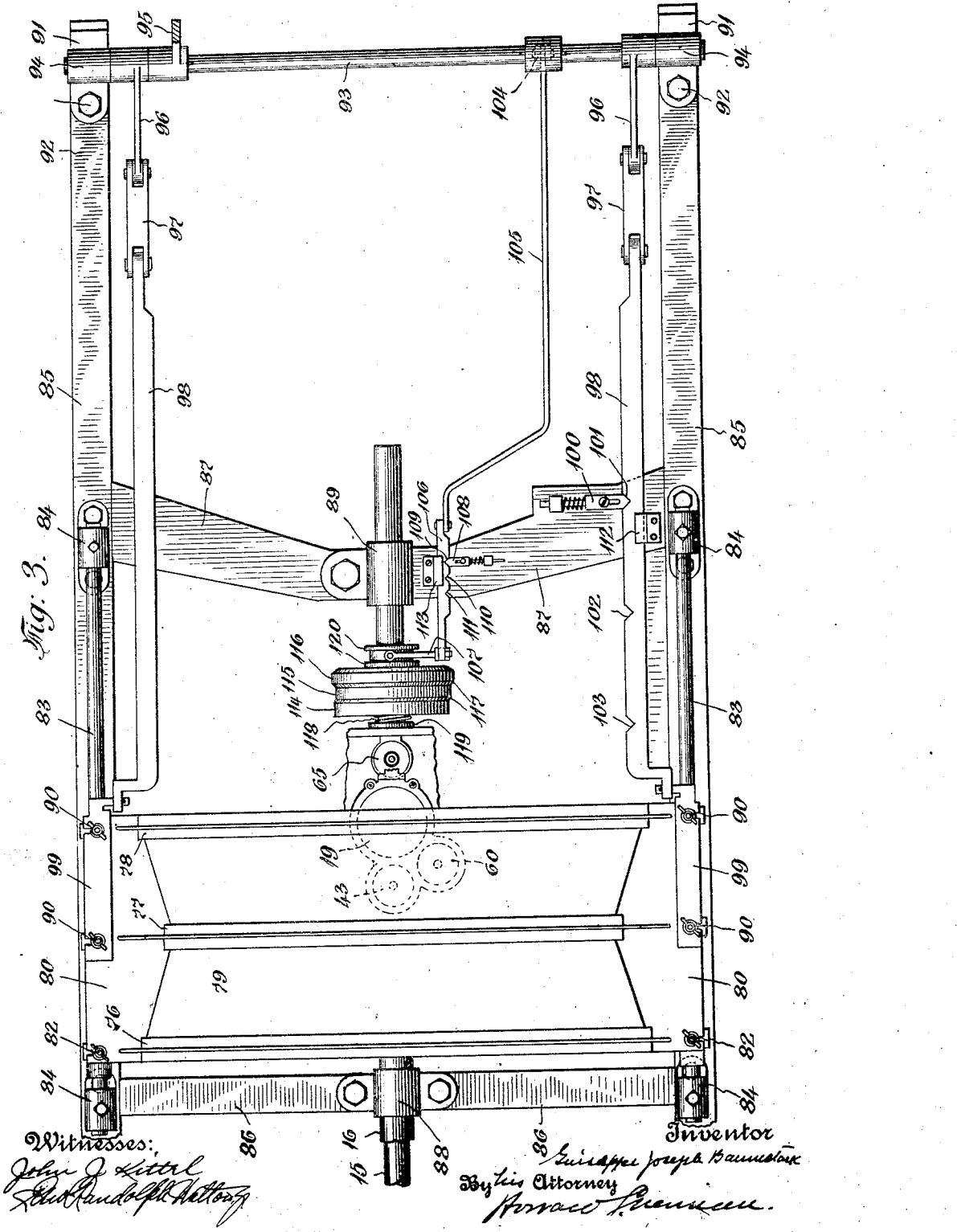

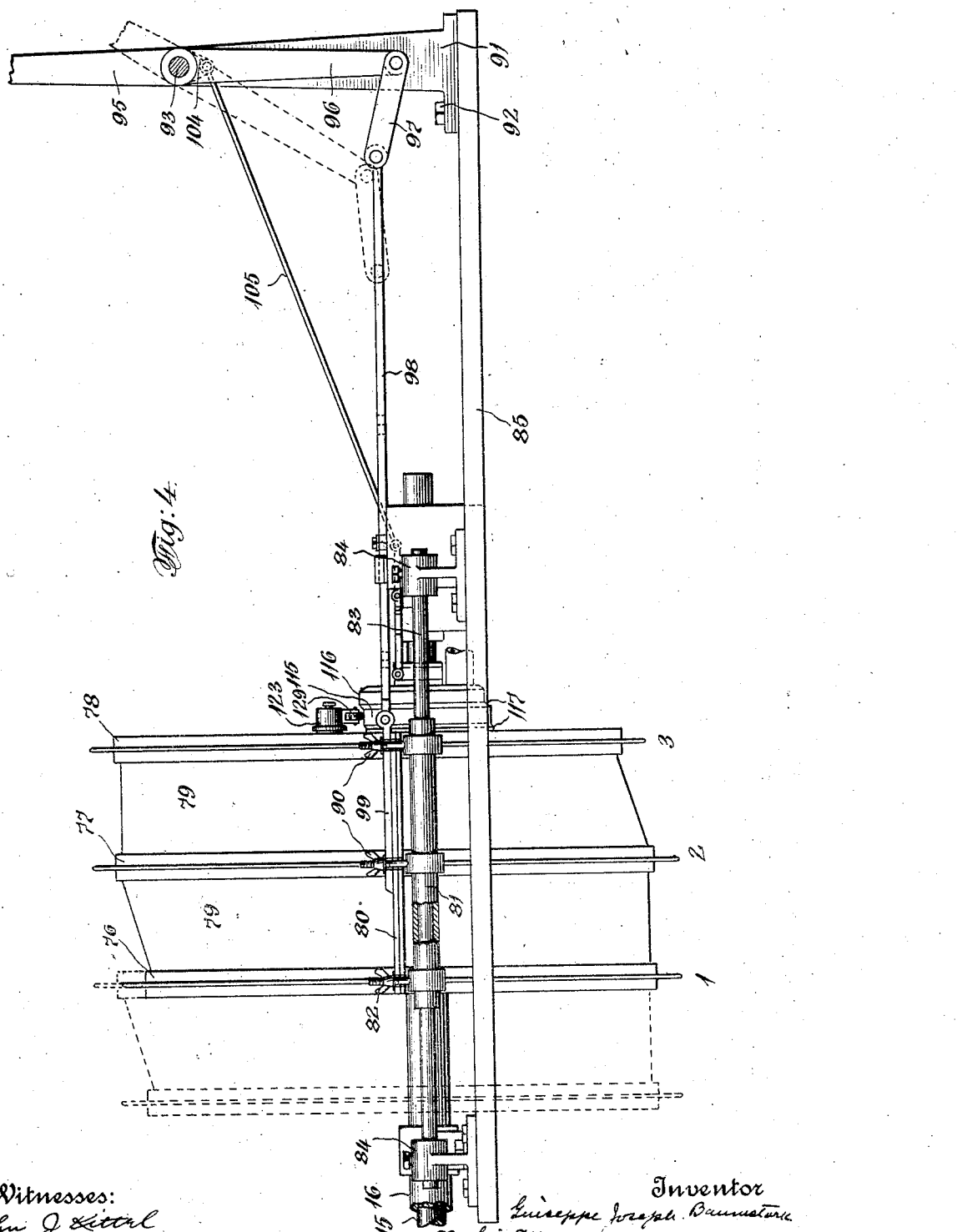

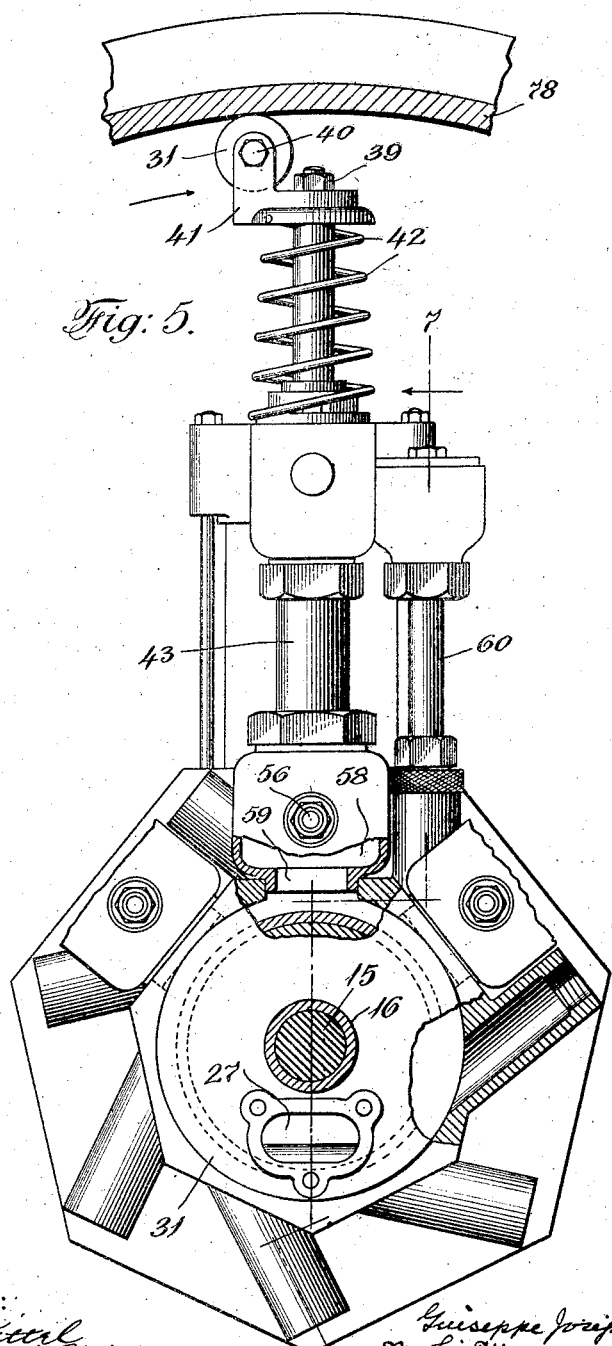

G. J. BAUMSTARK.
INTERNAL COMBUSTION ENGINE.
APPLICATION FILED JULY 21, 1914.
1,151,855.
Patented Aug. 31, 1915.
11 SHEETS—SHEET 6.
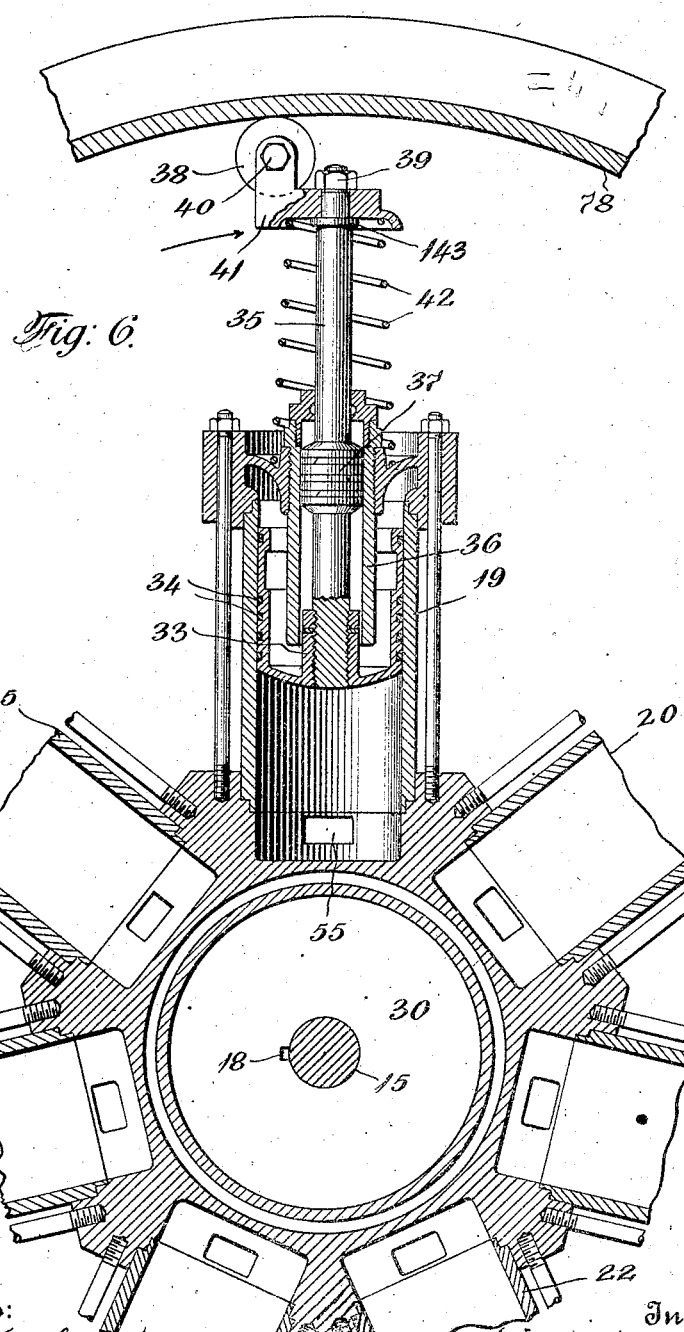

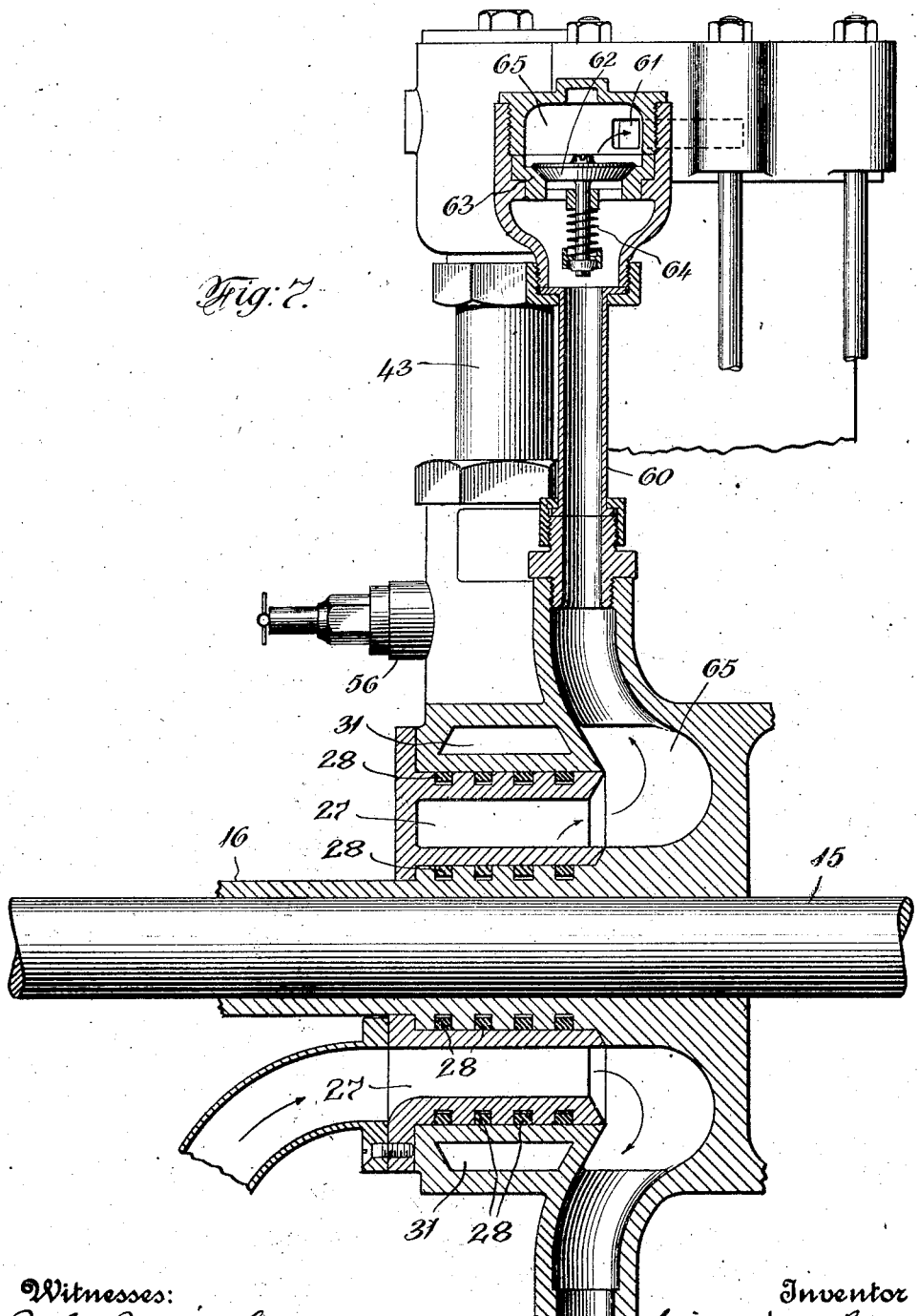

G. J. BAUMSTARK.
INTERNAL COMBUSTION ENGINE.
APPLICATION FILED JULY 21, 1914.
1,151,855.
Patented Aug. 31, 1915.
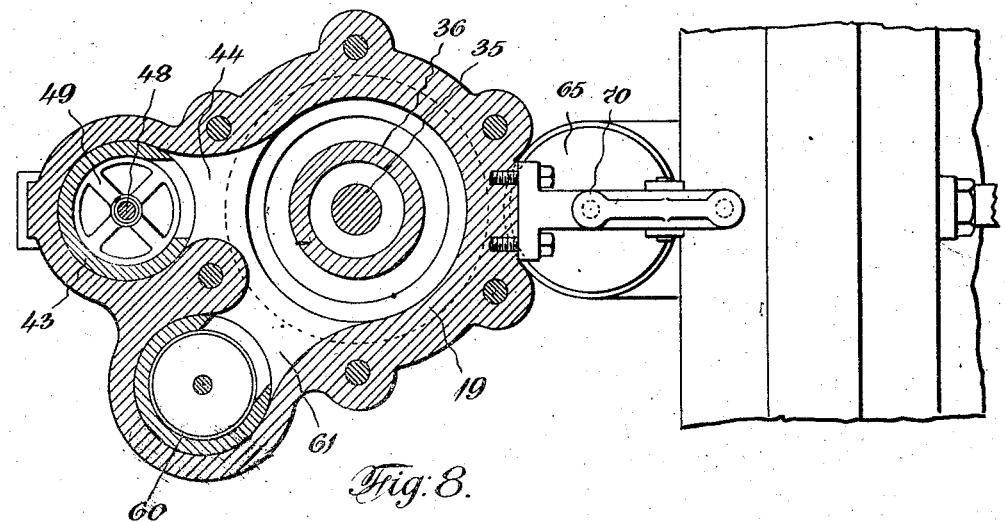
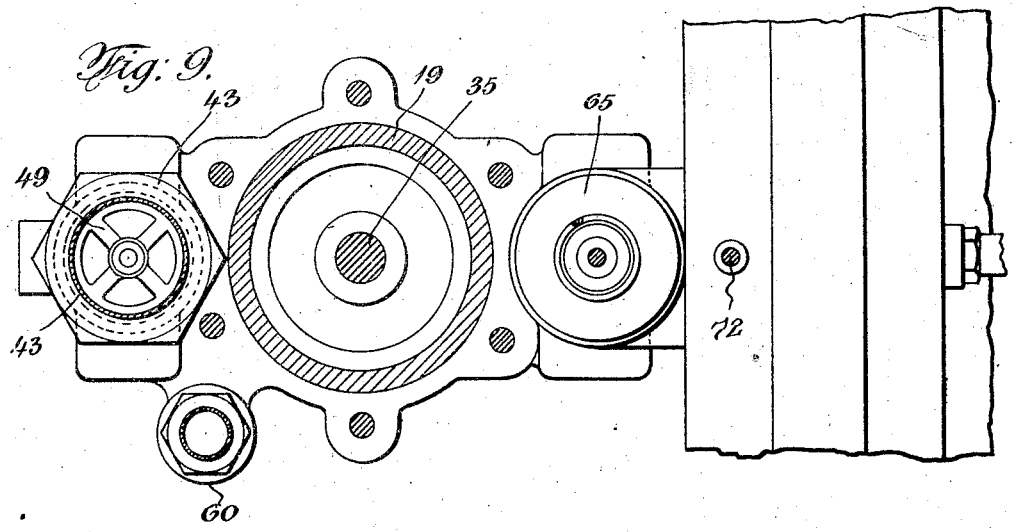

G. J. BAUMSTARK.
INTERNAL COMBUSTION ENGINE.
APPLICATION FILED JULY 21, 1914.
1,151,855.
Patented Aug. 31, 1915.
11 SHEETS—SHEET 9.
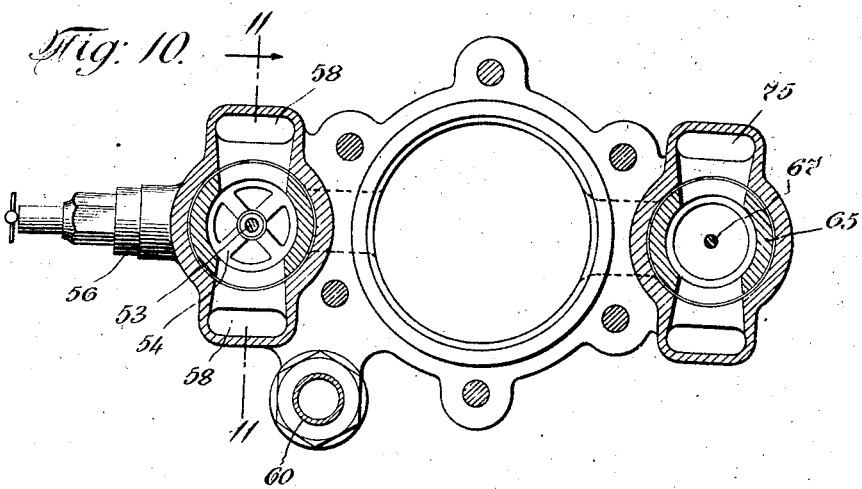
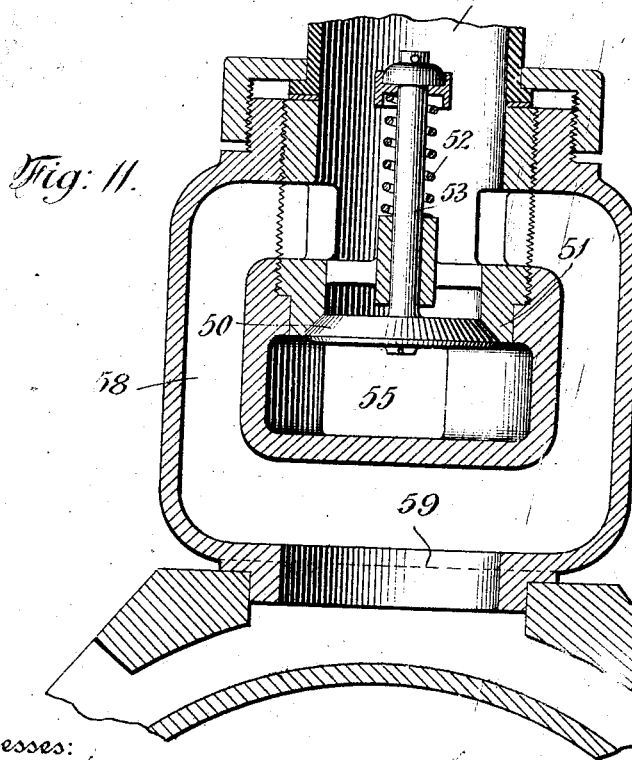

G. J. BAUMSTARK.
INTERNAL COMBUSTION ENGINE.
APPLICATION FILED JULY 21, 1914.
1,151,855.
Patented Aug. 31, 1915.
11 SHEETS—SHEET 11.
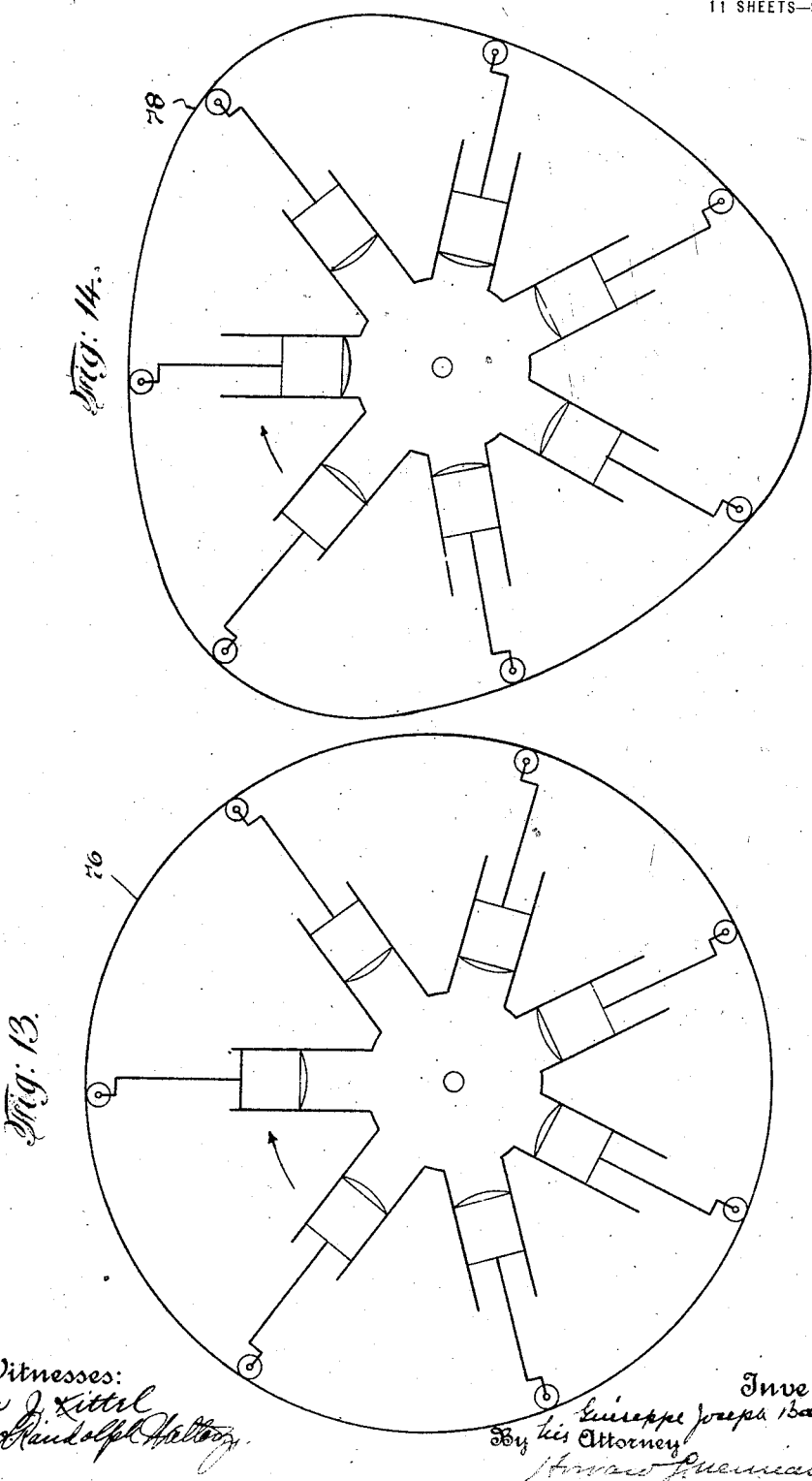

UNITED STATES PATENT OFFICE.

GUISEPPE JOSEPH BAUMSTARK, OF BRADLEY BEACH, NEW JERSEY.

INTERNAL-COMBUSTION ENGINE.

1,151,855.  Specification of Letters Patent.  Patented Aug. 31, 1915.

Application filed July 21, 1914. Serial No. 852,210.

*To all whom it may concern:*

Be it known that I, GUISEPPE JOSEPH BAUMSTARK, a citizen of France, and a resident of Bradley Beach, in the county of Monmouth and State of New Jersey, have invented certain new and useful Improvements in Internal-Combustion Engines, of which the following is a specification.

My invention has for its object an engine nal combustion engines in which a plurality of cylinders revolve around a common axis or shaft.

My invention relates to that class of inter- of the class described in which the power of the engine may be varied by increasing or decreasing the number of explosions for each revolution of the engine, that is, the power may be varied without varying the speed of the engine or the number of revolutions of the cylinders around the axis, this change of power being possible while the engine is running, without the necessity of stopping it to make the change.

My invention has for its further object an engine of the class described free from crank shafts, wrist-pins, or gearing, thus overcoming the friction, wear and practical difficulties and troubles incident to their use. The engine of my invention is therefore much more easily and cheaply kept in proper working condition, and a considerable saving is made in the cost of gas consumption.

A further object of my invention is an engine of the class described in which the danger of centrifugal force is almost entirely overcome, thus making it much safer to operate.

A further object of my invention is an engine of the class described which is capable of both a forward and reverse movement.

A further object of my invention is an engine of the class described in which all of the valves, with the exception of the exhaust valve, work automatically by the gas pressure of the piston movement and in which the exhaust valve works mechanically and in unison with the spark timing device.

A further object of my invention is an engine of the class described, in which all the moving parts are readily and cheaply replaced and easy of access.

My invention has for its further object an engine of the class described in which the varying of power may be easily and noiselessly accomplished when the engine is running or at rest, and in which self-starting may be easily and readily obtained.

The engine of my invention comprises a plurality of piston cylinders rotatable around a common axis and carrying therewith a shaft for power purposes. The explosion or combustion chambers are between the pistons and the shaft, the free ends of the pistons with their piston rods being extended away from the shaft. Completely surrounding the piston cylinders is a series of cam run-ways connected together by steps. These cam run-ways are non-rotatable but capable of a perpendicular movement across the axis of the piston cylinders. The ends of the piston rods, fitted with suitable rolling means, run around one of these cam run-ways when the engine is in action, the piston rods being pressed against the runway by suitable means. The pistons will thus take a reciprocating movement dependent upon the particular shape of the cam run-way in which they are running. By shifting the plurality of run-ways, the cylinder rods will ride across the step and then run in the new cam run-way thus brought to bear upon them. If this second run-way be a cam of different shape from the former it is evident that the pistons will assume a different speed of action. If for instance the engine is a four-cycle, and the first cam runway requires two revolutions of a piston cylinder, in order to exhaust, charge, compress and explode, and the second cam run-way is of such a form as to allow of all four of these operations during one revolution of a cylinder, it is evident that the power of the engine has been doubled without increasing its speed or the number of revolutions of the cylinders, and that this has been accomplished without stopping or slowing the engine.

In the known engines of this class, great danger from centrifugal force is experienced on account of the rapid revolution of the cylinders, which are free and unprotected at their ends farthest from the center. In my device this danger is entirely overcome, as the cam run-ways with their steps act as a bracing means, and the rapidly revolving cylinders run between the shaft and the runways.

By fixedly attaching the piston cylinders to the power shaft and positioning the combustion or explosion chamber at the inner end of the piston cylinders, I obtain the rotation of the shaft without the use of any shaft-cams, crank-shafts, wrist-pins or gearing, all of which are subject to much wear and are the usual causes of the pounding of the engine.

In order to overcome the expense, annoyance and the liability of disarrangement of mechanically moved valves, I have devised a means whereby all of the valves in my engine, with the exception of the exhaust valve, are moved automatically by the gas pressure caused by the movement of the piston. To accomplish this I make use of an intake cylinder and an auxiliary gas cylinder, both of which are connected to the piston cylinder by spring valves capable of being opened and closed by the pressure or suction caused by the movement of the piston. The intake cylinder is directly connected with the source of explosive gases and separated from the cylinder behind the piston by a valve capable of being opened by the suction caused by the downward movement of the piston. The auxiliary gas cylinder is directly connected with a chamber for the storage of the explosive gases. The upper part of the auxiliary gas cylinder is separated from the cylinder behind the piston by a valve capable of being opened by the pressure caused by the upward movement of the piston, and the lower end of the auxiliary gas cylinder is separated from the cylinder in front of the piston, that is the combustion or explosion chamber, by means of a valve capable of being opened by the suction caused by the upper movement of the piston. Therefore, when the piston descends, the auxiliary gas cylinder is closed and fresh gas is drawn in behind the piston, and when the piston ascends the intake cylinder is closed and the gas behind the piston is forced into the explosion chamber, except when the lower valve of the auxiliary gas cylinder is kept closed by the force of the exploded gases when the gas from behind the piston is forced through the auxiliary gas cylinder into the auxiliary gas chamber.

It is evident that a shifting of the piston rods from one cam run-way to another, will cause a change in the number of explosions to each revolution of a cylinder and hence it is necessary that the timing of the spark and the operation of the exhaust valve be changed to agree with the new number of explosions. This I accomplish by means of a commutator and exhaust valve mechanism operated by a plurality of cams similar to those of the cam run-ways, a shifting of the cam run-ways being automatically accompanied by a corresponding shifting of the cams operating the spark timer and exhaust valve, hence the spark and the exhaust will always be properly timed for the gas explosions, no matter how the latter be increased or decreased.

The starting of an engine of my device is much more easily accomplished than that of the ordinary engine of this class, because in some of the cam run-ways, two, three or four cylinders are in compression at the same time, one at least of which will be practically at the sparking point, and a supply of compressed gas is always ready to be fed to the cylinders from the auxiliary gas chamber, and hence but a slight movement is necessary to explode the gas in one of the cylinders and start the engine.

It will be seen that an engine of my invention of low power can be readily and easily converted into an engine of high power, while running, at the lower initial expense of construction of a low power engine, with all its advantages of reduced weight, cheapness of operation, ease of manipulation, and certainty of action coupled with the advantages of its conversion into an engine of varying power to suit requirements.

The accompanying drawings, illustrate by way of example, one form of an engine constructed according to my invention.

Figure 12:
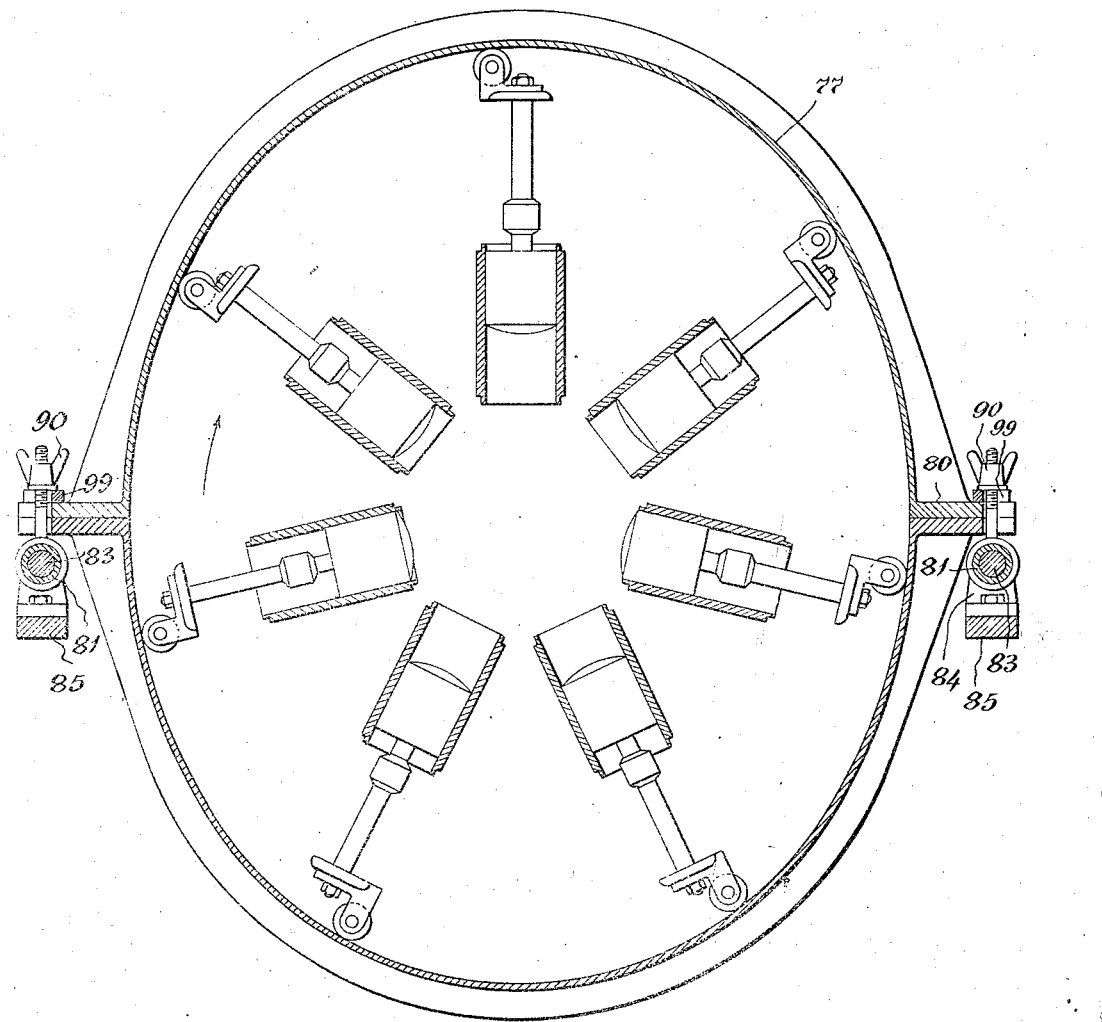

Figure 1 is a cross-section through one cylinder of the engine with its accompanying parts. Fig. 2 is a diagrammatic view showing the action of one cylinder during its revolution around the cam run-way illustrated in Fig. 12. Fig. 3 is a top plan view of the engine running on the cam run-way shown in Fig. 14, with parts removed for clearness. Fig. 4 is a side elevation of Fig. 3, the engine running on the cam run-way shown in Fig. 12, parts in section, the dotted line showing the position during the use of the cam run-way shown in Fig. 3. Fig. 5 is a front elevation of Fig. 1, parts in section, piston in outward position. Fig. 6 is a vertical section through the line 6—6 of Fig. 1. Fig. 7 is a vertical section through the line 7—7 of Fig. 5. Fig. 8 is a cross section through the line 8—8 of Fig. 1. Fig. 9 is a cross section through the line 9—9 of Fig. 1. Fig. 10 is a cross section through the line 10—10 of Fig. 1. Fig. 11 is a vertical section through the line 11—11 of Fig. 10. Fig. 12 is a cross section of the cam run-way 77 of Fig. 3, parts removed. Fig. 13 is a diagrammatic cross section of the cam run-way 76 of Fig. 3. Fig. 14 is a diagrammatic cross section of the cam run-way 78 of Fig. 3.

In the particular construction of an engine of my invention illustrated in the accompanying drawings, the shaft 15 is inclosed in the sleeve 16 to which it is fixedly attached by the key 17 fitted in the slot 18 of the sleeve 16. Fixedly attached to the sleeve 16 is a plurality of piston cylinders, 19, 20, 21, 22, 23, 24 and 25 with their various necessary working members as described later. The sleeve body 26 contains an intake chamber 27 revolubly attached to said sleeve body 26 and maintained in tight jointment therewith by means of the rings 28 fitted into grooves in the sleeve body. The intake chamber 27 is connected by means of the pipe 29 to a source of proper explosive gases. The movable parts are oiled by means of the oil well 30. The sleeve body 26 also carries the auxiliary gas chamber 31 and the exhaust chamber 32 for the exhaustion of the spent gases of explosion.

Each of the piston cylinders comprises the outer shell in which is fitted the movable piston 33, tightly fitted within the cylinder by means of packing rings 34. Attached to the piston 33 is a piston rod 35, extending outwardly from the piston and movable within the stuffing box 36, being fitted tightly therein by means of packing rings 37. The piston rod 35 extends outwardly through the stuffing box 36, terminating in a shoulder 143, to which is revolubly attached the caster bearing 38 by means of the nut 39. The caster bearing comprises a revoluble wheel 38, pivotally attached at 40 to the angle support 41. A spiral extension spring 42 surrounds the piston rod 35, bearing between the shoulder 143 and the top of the stuffing box 36.

By the side of the piston cylinder 19 is an auxiliary gas cylinder 43, the upper interior of which is connected to the piston cylinder 19 above the piston 33 by means of the passage 44. The upper part of the cylinder 43, is fitted with a spring valve 45, retained in a closed condition against the seat 46 by means of the spiral spring 47, the valve stem 48 being retained in position by means of the spider support 49, Fig. 8. The lower end of the cylinder 43 is opened and closed by means of a spring valve 50, it being retained in a closed position against the valve seat 51 by the spring 52, the stem 53 being supported by the spider 54, Fig. 10. This valve 50 connects and disconnects the auxiliary gas cylinder 43 with the explosion chamber 55, in which is the spark plug 56. The explosion chamber 55 extends across the face of the piston to the exhaust valve 57 to be described later. The auxiliary gas cylinder 43 is connected to the auxiliary gas chamber 31 by means of the by-pass 58, through the passage 59, Figs. 10 and 11. The auxiliary chamber 31 extends completely around the shaft 15 and sleeve 16 and is connected with all of the auxiliary gas cylinders as with the cylinder 43.

By the side of the piston cylinder 19 is an intake cylinder 60 shown particularly in Fig. 7. The top interior part of this intake cylinder 60 is connected with the piston cylinder 19 above the piston 33 by means of the passage 61. An upper chamber 65 is formed in the intake cylinder 60 by means of the spring valve 62 which is held in a closed condition against the valve seat 63 by means of the spiral spring 64. The lower end of the intake cylinder 60 is connected to the intake chamber 27 by means of the passage 65. The intake chamber 27 passes completely around the shaft 15 and sleeve 16 and is connected with each of the intake cylinders as with 60.

The means of exhausting the spent gases of combustion consists of an exhaust cylinder 65 opening into the explosion chamber 55, the opening being normally closed by the spring valve 57, held against the valve seat 66 by the spiral spring 68, operating between the head of the exhaust cylinder 65 and the head of the valve rod 67. This valve 57 is operated by means of the plunger rod 69, the pivotal member 70 movably pivoted at 71, and the rod 72 movable between the member 70 and the cam 73, to be explained later, the rod 72 carrying a rotatable wheel 74, operative upon the cam 73. The by-pass 75 of the exhaust cylinder 65 connects the exhaust cylinder with the exhaust chamber 32, this exhaust chamber 32 extending completely around the shaft and sleeve and being connected with each of the exhaust cylinders.

Surrounding the plurality of piston chambers is a plurality of varying cam run-ways 76, 77, 78, Figs. 3 and 4, connected by the steps 79, 79, so arranged that the wheel 38 of each piston rod 35 will run therein and abut thereon, the abutment being maintained by the spring 42, the gas pressure behind the piston 33 and the centrifugal force incident to the rotation of the cylinders during the running of the engine. The cam run-ways are non-revoluble but capable of a transverse movement in order to change the wheel 38 from one run-way to another. The mechanism producing this transverse movement of the cam run-ways is shown in Figs. 3 and 4. The run-ways and steps are fixedly attached to the plates 80, 80 which are attached to the sleeve 81 by means of the thumb-screws 82, 82, 90, 90. The sleeve 81 is slidably mounted upon the rods 83, 83, supported by the brackets 84, 84. The brackets 84, 84 are attached to a frame, consisting of the side bars 85, 85 held in alinement with the shaft 15 and sleeve 16 by the cross pieces 86, 86, 87, 87, carrying the shaft bearings 88, 89. Fixedly attached to each of the other ends of the side bars 85, 85 of the frame is a supporting upright 91, 91, by means of the bolts 92, 92. At a fixed distance from the side bars 85, 85, a bar 93 is revolubly attached to the uprights 91, 91, by means of the sleeves 94, 94 and a lever 95 is fixedly attached to the bar 93. A link system 96, 97, 98, 99 is fixedly attached to the bar 93 by the link member 96. The link 99 is fixedly attached to the plate 80 and the sleeve 81 by means of the thumb-screws 90, 90, the link system being so arranged that a partial revolution of the bar 93 will slide the run-ways 76, 77, 78 and steps 79, 79, along the bar 83. Upon the cross bar 87, a spring tongue 100 is attached to spring into the indents 101, 102, 103 upon one of the links 98 and hold the link from accidental movement. A second link system 104, 105, 106 is attached to the bar 93 by the link 104. Upon the bar 87, a spring tongue 108 is attached to spring into the indents 109, 110, 111, in the link 106 and hold the link from accidental movement. The brace plate 112 holds the link 98 from lateral displacement, and the brace plate 113 performs the same function for the link 106. The lengths and arrangements of the two link systems are such that a partial revolution of the bar 93, will cause the first link system to move from one indent to another of the link 98, relative to the tongue 100, as the second link system moves from one indent to another of the link 106 relative to the tongue 108.

The shaft 15 loosely carries the cams 114, 115, 116, connected by the steps 117, 117. This plurality of cams and steps does not revolve with the engine but remains stationary. A spiral spring 118 has a tendency to spread them away from the abutment 119, and they are moved along the shaft 16 and retained in a fixed position by means of the arm 107, fixedly attached to the link 106, the other end of the arm 107 being maintained between the abutments 120, 120 of the cam and step member. The cams 114, 115 and 116 are of such shapes respective to the cams 76, 77 and 78 that they will properly time the explosions and operation of the exhaust valves.

The commutator comprises a mechanism whereby the timing of the electrical circuit and the opening and closing of the exhaust valve are made to work co-jointly in accordance with the position of the pistons due to the particular cam run-way operating upon the piston-rod. In Fig. 1, the commutator comprises a member 73, a ratchet wheel 122 and a member 123, integral to each other, revoluble upon the shaft 124, which is held by the supporting members 125, and which is capable of perpendicular movement. The pawl 126 pivotally attached to the support 127 by the pivot 128, allows of the revolution of the commutator and its retention, a second pawl not shown in the drawing being upon the reverse side of the ratchet wheel 122. The wheel 129 attached to the member 123 by means of the arm 130, allows the commutator to follow the cam 116, as the commutator revolves with the engine, thus raising and lowering the commutator members to agree with the shape of the cam 116. Upon the member 123 is a series of electrical connection points 131 to connect with the point 132, which is in turn connected with the source of electrical power. The points upon the member 123 are so arranged that they will connect with the point 132 at certain positions of the roller 129 upon the cam 116. The shape of the member 73 is such that the raising of the whole commutator member will open the exhaust valve 57 by raising the rod 72, operating the pivotal member 70 and pressing down the valve rod 69 at the proper time for the exhaust gases as governed by the cam movement. It will thus be seen that the revolution of the wheel 129 around the cam 116, will fire the explosive gases and operate the exhaust valve at certain predetermined points. It will also be seen from an examination of Figs. 3 and 4, that when the bar 93 is partially revolved by means of the lever 95, the cam run-ways 76, 77, 78 and the cams 114, 115, 116 will be moved simultaneously, and into such a position that the firing and exhaust operated by the cams 114, 115, 116 will be properly timed for the position of the pistons as operated by the cam run-ways 76, 77, 78.

The effect of the cam run-ways and the shifting devices while the engine is running may be seen from Figs. 3 and 4. In Fig. 3 the wheel 38 at the top of the piston rod in the piston chamber 19 is running around a slightly depressed groove in the run-way 78, a diagrammatic cross section of which is shown in Fig. 14. At the same time the commutator device, governing both the firing and the exhaust valve is being controlled by the cam movement 116, Fig. 1. By moving the lever 95, the cam run-ways and the commutator device are shifted into the positions shown in Fig. 4, the wheel 38 passing from the cam run-way 78 to the cam run-way 77 across the intervening step 79. The piston is now being controlled by the run-way 77, a diagrammatic cross-section of which is shown in Fig. 12, and the commutator device and exhaust control 123 is running upon the cam 115, to properly time the spark and exhaust. During the passage of the piston rod wheel across the step 79, the commutator prevents the formation of an electric current. The dotted line of Fig. 4 shows the position of the cam run-way 76 in Fig. 3, a diagrammatic cross section of the cam run-way 76 is shown in Fig. 13.

As all of the valves, with the exception of the exhaust valve, which is mechanical, are automatic and operated by the pressure of the gases and the suction of the piston, it is evident that any form of a cam run-way may be employed in the operation of the piston if the proper commutator and exhaust valve mechanism are used, but in the drawings the three forms of cam run-ways illustrated in Figs. 12, 13 and 14 are employed. The cam of Fig. 13 is circular but eccentric, that of Fig. 12 is elliptical and that of Fig. 14 is of a rounded triangular form. As the engine is four-cycle, in the form shown in Fig. 13 each cylinder will make two revolutions for each explosion, or three and a half explosions for each revolution of a seven cylinder engine. In the form of Fig. 12, each cylinder will have one explosion for each revolution, or seven explosions for each revolution of a seven cylinder engine, while the form shown in Fig. 14, will give ten and a half explosions for each revolution of the engine.

A clear description of the operation of the piston, and the various valves, of the intake and exhaustion of the gases and of the action of the cam run-way while the engine is running may be obtained from Fig. 2, which diagrammatically illustrates the course of one cylinder during one revolution around the eccentric cam run-way 77 shown in Fig. 12. At the point 133, the piston has reached its highest position and on its downward movement exhausts the spent gases through the exhaust valve 57 into the exhaust cylinder 65 and through 75 into the exhaust chamber 32. As the piston descends it opens the valve 62 of the intake cylinder 60 and draws in fresh gas through the pipe 61 from the intake chamber 27. This downward movement of the piston also retains the valves 45 and 50 of the auxiliary cylinder 43 in a closed condition. The piston is thus discharging the spent gases and drawing in fresh gas behind itself. At the point 134 the same conditions continue. After passing the point 135, the piston begins to ascend and as at the point 136, the piston in its upward movement, closes the valve 62 of the intake cylinder 60 and the exhaust valve 57 of the exhaust cylinder 65, and opens the valves 45 and 50 of the auxiliary cylinder 43, forcing the gases behind it through the auxiliary cylinder 43 and drawing them into the combustion chamber 55. If this amount of gas is insufficient, additional gas is drawn from the auxiliary chamber 31 through the pipe 58. If the amount of gas is greater than is required it would be forced back into the auxiliary chamber 31. This operation continues as the piston passes from the point 136 to the point 138. As the piston passes from the point 138 to the point 141 it descends and compresses the gas in the combustion chamber by keeping the valve 57 of the exhaust cylinder 65 closed, and closing the valves 45 and 50 of the auxiliary cylinder, at the same time opening the valve 62 of the intake cylinder 60 and drawing in a new charge behind it. The explosion takes place at the point 141, and the upward movement of the piston from the point 141 to the point 133, closes the valve 62 of the intake cylinder, opens valve 45 of the auxiliary chamber 43, the valve 50 of the auxiliary cylinder 43, being retained in a closed condition by the gas pressure in the explosion chamber 53, forcing the gases from behind the piston into the auxiliary chamber 31 through the pipe 58. It will thus be seen that the intake chamber is capable of supplying all of the piston cylinders with fresh gas as they need it, and the auxiliary chamber is always capable of giving or receiving the gas to all of the cylinders as they require.

It is evident that an engine can be made according to my invention with only one cam run-way having all of the advantages of the engine illustrated with the exception of the changing of power.

I do not limit myself to the particular number, shape, size or arrangement of parts illustrated as it is evident that they may be greatly varied without going beyond the scope of my invention as described and claimed.

What is claimed, is:

1. In an internal combustion engine, in combination, a revoluble shaft, a plurality of radially disposed cylinders fixedly attached thereto, a reciprocating piston within each cylinder, an explosion chamber between the head of the piston and the shaft, a piston rod extending outwardly from the piston and fixedly attached thereto, a cam run-way comprising a series of different shaped cams surrounding the engine in which said piston rod moves, said cam-way being capable of a movement transverse to the path of the revoluble piston rods, means for moving the cam run-way transverse to the path of the revoluble piston rods, an inlet for explosive gases, an outlet for spent gases, and means for exploding a gas.

2. In an internal combustion engine, in combination, a revoluble shaft, a plurality of radially disposed cylinders fixedly attached thereto, a reciprocating piston within each cylinder, an explosion chamber between the head of the piston and the shaft, an outward chamber behind the piston, inlets for the admission of gas into th out-ward chamber, inlets for the admission of gas into the explosion chamber, an outlet in the explosion chamber for spent gases, means for conducting the gases from the outward chamber into the explosion chamber, the rear or outward face of the piston carrying a piston rod abutting on and movable around a cam run-way comprising a series of different shaped cams, said cam-way being capable of a movement transverse to the path of the revoluble piston rods, means for moving the cam run-way transverse to the path of the revoluble rods, and means for exploding a gas in the explosion chamber.

3. In an internal combustion engine, in combination, a revoluble power shaft, a plurality of radially disposed cylinders fixedly attached thereto, a reciprocating piston within each cylinder, an explosion chamber, a piston rod attached to the piston without the explosion chamber, the piston being operated by a cam run-way comprising a series of different shaped cams capable of a movement transverse to the path of the revoluble piston rods against which it is held in abutment and around which it is moved by the force of the explosion, means for moving the cam run-way transverse to the path of the revoluble piston rods, inlets, outlets, and means for exploding a gas in the explosion chamber.

4. In an internal combustion engine, in combination, a revoluble power shaft carrying a plurality of radially disposed cylinders, a reciprocating piston within each cylinder, an explosion chamber, a non-revoluble cam run-way comprising a series of different shaped cams operating the pistons around which the cylinders and attached power shaft rotate, said cam run-way being capable of a movement transverse to the path of the revoluble piston rods, means for moving the cam run-way transverse to the path of the revoluble piston rods, inlets, outlets, and a means for causing the explosion of a gas in the explosion chamber.

5. In an internal combustion engine, in combination, a power shaft carrying a plurality of radially disposed cylinders, a reciprocating piston within each cylinder, the reciprocating movement of which is controlled by a cam run-way comprising a series of different shaped cams, said cam run-way being capable of a movement transverse to the path of the revoluble piston rods, means for moving the cam run-way transverse to the path of the revoluble piston rods, an explosion chamber between the inner head of the piston and the power shaft, inlets, outlets, and means for exploding a gas in the explosion chamber at predetermined positions of the piston.

6. In an internal combustion engine, in combination, a revoluble power shaft, a plurality of radially disposed cylinders fixedly attached thereto, a reciprocating piston within each cylinder, an explosion chamber, and means for exploding the combustion gases, to cause the cylinders and shaft to revolve by the abutment of a piston member against a non-revoluble cam run-way comprising a series of different shaped cams capable of a movement transverse to the path of the revoluble piston rods, and means for moving the cam run-way transverse to the path of the revoluble piston rods.

7. In an internal combustion engine, in combination, a revoluble power shaft, a plurality of radially disposed cylinders fixedly attached thereto, a reciprocating piston within each cylinder, an explosion chamber between the piston and the shaft, and means for exploding the combustion gases to cause the revolution of the cylinders and power shaft by the abutment of a piston member against a non-revoluble cam run-way comprising a series of different shaped cams situated around the series of radially disposed cylinders, said cam run-way being capable of a movement transverse to the path of the revoluble piston rods, and means for moving the cam run-way transverse to the path of the revoluble piston rods.

8. In an internal combustion engine, in combination, a revoluble power shaft, a plurality of radially disposed cylinders fixedly attached thereto, a reciprocating piston within each cylinder, an explosion chamber so situated that the explosion of a combustion gas will force the piston outwardly away from the power shaft against a cam run-way comprising a series of different shaped cams capable of a movement transverse to the path of the revoluble piston rods to cause a reciprocating movement of the piston and revolution of the shaft, means for moving the cam run-way transverse to the path of the piston rods, and means for exploding a gas.

9. In an internal combustion engine, in combination, a revoluble power shaft, a plurality of radially disposed cylinders fixedly attached thereto, a reciprocating piston within each cylinder, an explosion chamber between the piston head and the power shaft, an inlet pipe with a valve for allowing the admission of gas behind the piston by the inward movement of the piston, the valve being closed by the outward movement of the piston, a means on the outward end of the piston for abutting against a non-revoluble cam run-way comprising a series of different shaped cams capable of a movement transverse to the path of the revoluble piston rods to cause a reciprocating movement of the pistons and a revolution of the power shaft, means for moving the cam run-way transverse to the path of the revoluble piston rod, inlets and outlets for gas, and means for exploding a gas in the explosion chamber.

10. In an internal combustion engine, in combination, a revoluble power shaft, a plurality of radially disposed cylinders fixedly attached thereto, each containing a reciprocating piston the inner head of which is operative within an explosion chamber situated between the shaft and the piston, means for the introduction of gas behind the piston, means for the conducting of gas from behind the piston into the explosion chamber, means for conducting the gas from behind the piston into an auxiliary gas chamber, means for exhausting the spent gas, means whereby the explosion of gas in the explosion chamber will force an outwardly extended piston rod against a cam run-way comprising a series of different shaped cams capable of a movement transverse to the path of the revoluble piston rods to cause the cylinders and shaft to revolve and to force the pistons inwardly and outwardly within the cylinders, means for moving the cam run-way transverse to the path of the revoluble piston rods, and means for the explosion of the gas at predetermined positions of the cylinder relative to the cam run-way.

11. In an internal combustion engine, in combination, a power shaft, a plurality of radially disposed cylinders fixedly attached thereto, each cylinder containing a reciprocating piston, an explosion chamber between the piston and the shaft, the outward head of the piston movable within a chamber communicating with a source of gas supply, said outward chamber communicating with an auxiliary gas cylinder which in turn communicates with the explosion chamber and an auxiliary gas chamber, the outward head of the piston carrying a piston rod abutting upon a cam run-way comprising a series of different shape cams of such form and construction that the explosion of gas will cause the cylinder and shaft to revolve, the movement giving the piston an inward and outward movement within the cylinder, said cam run-way being capable of a movement transverse to the path of the revoluble piston rods, means for moving the cam run-way transverse to the path of the revoluble piston rods, means for the exhaustion of the spent gases, and means for the explosion of the gas at predetermined positions of the piston rod upon the cam run-way.

12. In an internal combustion engine, in combination, a revoluble power shaft, a plurality of radially disposed cylinders fixedly attached thereto, each cylinder containing a reciprocating piston, an explosion chamber between the inner head of the piston and the shaft, a piston rod attached to the outward head of the piston, the exterior end of the piston rod abutting against a cam run-way member surrounding the cylinders, said cam run-way member comprising a series of varying cam run-ways connected together by steps and capable of a movement which will bring the piston rod end into alinement with any one of the cam run-ways, an inlet for the introduction of gas, an outlet for the spent gases, and means for the explosion of gas within the explosion chamber.

13. In an internal combustion engine, in combination, a revoluble power shaft, a plurality of radially disposed chambers fixedly attached thereto each containing a reciprocating piston, an explosion chamber situated between the inner head of the piston and the shaft, a piston rod attached to the piston without the explosion chamber, the piston being operated by a cam run-way member with which it is held in abutment by the piston rod and around which it is moved by the force of the explosion of a gas, the cam run-way member comprising a series of varying cam run-ways connected together by steps and capable of a movement which will cause the piston rod to come into alinement with any one of the cam run-ways, inlets and outlets for gas, and means for the explosion of gas within the explosion chamber.

14. In an internal combustion engine, in combination, a revoluble power shaft, a plurality of radially disposed cylinders fixedly attached thereto, each containing a reciprocating piston, an explosion chamber between the inner head of the piston and the shaft, the outward head of the piston being movable within an outward chamber communicating with a source of gas supply and carrying a piston rod abutting upon a non-revoluble cam run-way member comprising a series of varying cam run-ways connected by steps, the cam run-way member being capable of a movement which will allow the piston rod to pass from one cam run-way to another, inlets and outlets for gas, and means for the explosion of gas within the explosion chamber at predetermined positions of the piston rod upon the cam run-way.

15. In an internal combustion engine, in combination, a revoluble power shaft, a plurality of radially disposed cylinders fixedly attached thereto, each containing a reciprocating piston, an explosion chamber situated between the inner head of the piston and the shaft, the outward head of the piston being movable within an outward chamber, means for the admission of gas into the outward chamber by the inward stroke of the piston and the conduction of the gas from the outward chamber into the explosion chamber or an auxiliary gas chamber by the outward stroke of the piston, the outward head of the piston carrying a piston rod in abutment with a non-revoluble cam run-way member comprising a series of cam run-ways connected by steps and capable of a movement which will pass the abutting end of the piston rod from one cam run-way to another, inlets and outlets for gas, and means for the explosion of gas in the explosion chamber at predetermined positions of the piston rod upon the cam run-ways.

16. In an internal combustion engine, in combination, a revoluble power shaft, a plurality of radially disposed cylinders fixedly attached thereto, each containing a reciprocating piston, an explosion chamber situated between the inner head of the piston and the shaft, the outward head of the piston having a reciprocating movement within an outward chamber, said outward chamber communicating with a source of gas supply in such a manner that gas will be drawn in by the inward stroke of the piston, the supply pipe being closed automatically by the outward stroke of the piston preventing the return of the gas to the gas supply, means for forcing the gas from the outward chamber into the explosion chamber or an auxiliary gas chamber by the outward stroke of the piston, the outward head of the piston carrying a piston rod abutting upon a non-revoluble cam run-way member surrounding the plurality of pistons comprising a series of connected cam run-ways capable of a movement which will cause the piston rod to pass from one cam run-way to another, inlets and outlets for gas, and means for exploding gas in the explosion chamber.

17. In an internal combustion engine, in combination, a revoluble power shaft, a plurality of radially disposed cylinders fixedly attached thereto, each containing a reciprocating piston, an explosion chamber situated between the inner head of the piston and the shaft, the piston movable within the explosion chamber and an outward chamber, the latter being connected with a source of gas supply and with an auxiliary gas chamber allowing the passage of gas from the outward chamber into the explosion chamber or the auxiliary gas chamber, the piston carrying a piston rod abutting upon a cam runway member around which it is revoluble, the cam run-way member comprising a series of connected cam run-ways capable of a movement transferring the abutting end of the piston rod from one cam run-way to another, inlets and outlets for gas, and means for the explosion of gas within the explosion chamber.

18. In an internal combustion engine, in combination, a revoluble power shaft, a plurality of radially disposed cylinders fixedly attached thereto, each containing a reciprocating piston, an explosion chamber situated between the inner head of the piston and the shaft, the inner head of the piston movable within the explosion chamber and the outward head of the piston movable within an outward chamber communicating with an auxiliary gas cylinder allowing the passage of gas from the outward chamber through the auxiliary gas cylinder into the explosion chamber or an auxiliary gas chamber by means of the outward stroke of the piston, the piston carrying a piston rod abutting upon and revoluble around a cam run-way member comprising a series of connected cam run-ways the cam run-way member being capable of a movement transverse to the path of the revoluble piston rods, inlets and outlets for gas and means for the explosion of gas in the explosion chamber at predetermined positions of the piston within the cylinder.

19. In an internal combustion engine, in combination, a revoluble power shaft, a plurality of radially disposed cylinders fixedly attached thereto, each containing a reciprocating piston, an explosion chamber situated between the inner head of the piston and the shaft, the inner head of the piston movable within the explosion chamber and the outward head of the piston movable within an outward chamber, which communicates with a source of gas supply and to an auxiliary gas cylinder, the latter communicating with the explosion chamber and an auxiliary gas chamber, in such a manner that an inward stroke of the piston will draw gas from the gas supply into the outward chamber and the outward stroke of the piston will force the gas from the outward chamber through the auxiliary gas cylinder into the explosion chamber or the auxiliary gas chamber, the strokes of the piston being governed by a non-revoluble cam run-way member upon which a piston rod abuts and around which it revolves, the cam run-way member comprising a series of connected cam run-ways capable of a movement perpendicular to the axis of the piston rod, inlets and outlets for gas, and means for the explosion of gas in the explosion chamber at predetermined positions of the piston in the cylinder.

20. In an internal combustion engine, in combination, a revoluble power shaft, a plurality of radially disposed cylinders fixedly attached thereto, each containing a reciprocating piston, an explosion chamber situated between the inner head of the piston and the shaft, the inner head of the piston movable within the explosion chamber and the outward head of the piston movable within an outward chamber, the outward chamber having a communication with a source of gas supply, means for opening the communication by a downward stroke of the piston and closing it by an outward stroke of the piston, the outward chamber having a further communication with an auxiliary gas cylinder having communication with the explosion chamber and an auxiliary gas chamber, means for drawing gas from the outward chamber and the auxiliary gas chamber into the explosion chamber, means for passing the gas from the outward chamber into the auxiliary gas chamber, the piston being operative by an attached piston rod bearing upon and revoluble around a non-revoluble series of connected cam run-ways capable of a movement transverse to the path of the revoluble piston rods, an outlet for the exhaustion of spent gas, and means for exploding gas in the explosion chamber at predetermined positions of the piston in the cylinder.

21. In an internal combustion engine, in combination, a revoluble power shaft, a plurality of radially disposed cylinders fixedly attached thereto, each containing a reciprocating piston, an explosion chamber situated between the inner head of the piston and the shaft, the inner head of the piston movable within the explosion chamber and the outward head of the piston movable within an outward chamber, the piston being given a reciprocating motion by the revolution of an attached piston rod around a series of connected non-revoluble abutting cam run-ways capable of a movement transverse to the path of the revoluble piston rods, the revolution being caused by the force of exploded gases against the piston head and the movement of the piston rod around the abutting cam run-ways, means whereby the inward stroke of the piston draws gas into the outward chamber, means whereby the outward stroke of the piston will remove the gas from the outward chamber and introduce gas into the combustion chamber, means for the opening and closing of an exhaust outlet communicating with the explosion chamber, and means for exploding gas in the explosion chamber at predetermined positions of the piston.

22. In an internal combustion engine, in combination, a revoluble power shaft, a plurality of radially disposed cylinders fixedly attached thereto, each containing a reciprocating piston, an explosion chamber situated between the inner head of the piston and the shaft, the inner head of the piston movable within the explosion chamber and the outward head of the piston movable within an outward chamber, the outward chamber having a communication with a source of gas supply, means for opening the communication by a downward stroke of the piston and closing it by an outward stroke of the piston, the outward chamber having a further communication with an auxiliary gas cylinder having communication with the explosion chamber and an auxiliary gas chamber, means for drawing gas from the outward chamber and the auxiliary gas chamber into the explosion chamber, means for passing the gas from the outward chamber into the auxiliary gas chamber, a piston rod attached to the piston and revoluble around and abutting upon a series of connected non-revoluble cam run-ways surrounding the piston rods of the radially disposed pistons, means for moving the cam run-ways across the path of the piston rods and maintaining the cam run-ways free from accidental displacement, means for opening and closing an exhaust outlet in the explosion chamber, and means for exploding gas in the explosion chamber.

23. In an internal combustion engine, in combination, a revoluble power shaft, a plurality of radially disposed cylinders fixedly attached thereto, each containing a reciprocating piston, an explosion chamber situated between the inner head of the piston and the shaft, the outward head of the piston having a reciprocating movement within an outward chamber, said outward chamber communicating with a source of gas supply in such a manner that gas will be drawn in by the inward stroke of the piston, the supply pipe being closed automatically by the outward stroke of the piston preventing the return of the gas to the gas supply, means for forcing the gas from the outward chamber into the explosion chamber or an auxiliary gas chamber by the outward stroke of the piston, the outward head of the piston carrying a piston rod abutting upon a non-revoluble cam run-way member surrounding the plurality of pistons comprising a series of connected cam run-ways capable of a movement which will cause the piston rod to pass from one cam run-way to another, means for maintaining the cam run-way member in a position in which the path of the piston rod will correspond to one of the cam run-ways, inlets and outlets for gas, and means for exploding gas in the explosion chamber when the piston rod is at predetermined points upon the cam run-way.

24. In an internal combustion engine, in combination, a revoluble power shaft, a plurality of radially disposed cylinders fixedly attached thereto, each containing a reciprocating piston, an explosion chamber situated between the inner head of the piston and the shaft, the inner head of the piston movable within the explosion chamber and the outward head of the piston movable within an outward chamber, which communicates with a source of gas supply and to an auxiliary gas cylinder, the latter communicating with the explosion chamber and an auxiliary gas chamber, in such a manner that an inward stroke of the piston will draw gas from the gas supply into the outward chamber and the outward stroke of the piston will force the gas from the outward chamber through the auxiliary gas cylinder into the explosion chamber or the auxiliary gas chamber, the strokes of the piston being governed by a non-revoluble cam run-way member upon which a piston rod abuts and around which it revolves, the cam run-way member comprising a series of connected cam run-ways capable of a movement perpendicular to the axis of the piston rod, and means for synchronizing the opening and closing of an exhaust valve in the explosion chamber with the exploding of gas in the explosion chamber.

25. In an internal combustion engine, in combination, a revoluble power shaft, a plurality of radially disposed cylinders fixedly attached thereto, each containing a reciprocating piston, an explosion chamber situated between the inner head of the piston and the shaft, the outward head of the piston having a reciprocating movement within an outward chamber, said outward chamber communicating with a source of gas supply in such a manner that gas will be drawn in by the inward stroke of the piston, the supply pipe being closed automatically by the outward stroke of the piston preventing the return of the gas to the gas supply, the outward chamber communicating with an auxiliary gas cylinder which in turn communicates with the explosion chamber and an auxiliary gas chamber, means whereby the inward stroke of the piston automatically closes the communication between the outward chamber, the auxiliary gas cylinder and the explosion chamber, and whereby the outward stroke of the piston automatically opens the communications forcing gas from the outward chamber into the explosion chamber or the auxiliary gas chamber, the outward head of the piston carrying a piston rod abutting against and revoluble upon a series of non-revoluble connected cam runways surrounding the radially disposed pistons, means for moving the cam run-ways across the path of the piston rods, and maintaining one of them in the path of the piston rods, and means for synchronizing the action of an exhaust valve in the explosion chamber with the exploding of gas in the explosion chamber, at predetermined positions of the piston.

26. In an internal combustion engine, in combination, a revoluble power shaft, a plurality of radially disposed cylinders fixedly attached thereto, each containing a reciprocating piston, an explosion chamber situated between the inner head of the piston and the shaft, the inner head of the piston movable within the explosion chamber and the outward head of the piston movable within an outward chamber, which communicates with a source of gas supply and to an auxiliary gas cylinder, the latter communicating with the explosion chamber and an auxiliary gas chamber, in such a manner that an inward stroke of the piston will draw gas from the gas supply into the outward chamber and the outward stroke of the piston will force the gas from the outward chamber through the auxiliary gas cylinder into the explosion chamber or the auxiliary gas chamber, the strokes of the piston being governed by a non-revoluble cam run-way member upon which a piston rod abuts and around which it revolves, the cam run-way member comprising a series of connected cam run-ways capable of a movement perpendicular to the axis of the piston rod, and means for synchronizing the movement of the cam run-ways, with the action of an exhaust valve in the explosion chamber and the explosion of gas in the explosion chamber at predetermined positions of the piston.

27. In an internal combustion engine, in combination, a revoluble power shaft, a plurality of radially disposed cylinders fixedly attached thereto, each containing a reciprocating piston, an explosion chamber situated between the inner head of the piston and the shaft, the inner head of the piston movable within the explosion chamber and the outward head of the piston movable within an outward chamber, the outward chamber communicating with a source of gas supply, means whereby the communication is automatically opened and closed by the inward and outward strokes of the piston respectively, the outer chamber having a further communication with an auxiliary gas cylinder, which auxiliary gas cylinder is divided into three compartments by means of valves capable of being closed by an upward pressure and opened by a downward pressure, the upper compartment communicating with the outward chamber, the middle compartment communicating with an auxiliary gas chamber and the lower compartment communicating with the explosion chamber, the piston carrying a piston rod abutting upon and revoluble around a series of non-revoluble connected cam run-ways, capable of receiving a movement perpendicular to the axis of the piston rod, means for synchronizing the movement of the cam run-ways, with the operation of an exhaust valve in the explosion chamber and the exploding of gas in the explosion chamber at predetermined positions of the piston to cause the piston rod and the cylinders to revolve within the cam run-ways.

28. In an internal combustion engine, in combination, a revoluble power shaft, a plurality of radially disposed cylinders fixedly attached thereto, each containing a reciprocating piston, an explosion chamber situated between the inner head of the piston and the shaft, the inner head of the piston movable within the explosion chamber and the outward head of the piston movable within an outward chamber, the outward chamber communicating with a source of gas supply, means whereby the communication is automatically opened and closed by the inward and outward strokes of the piston respectively, the outer chamber having a further communication with an auxiliary gas cylinder, which auxiliary gas cylinder is divided into three compartments by means of valves capable of being closed by an upward pressure and opened by a downward pressure, the upper compartment communicating with the outward chamber, the middle compartment communicating with an auxiliary gas chamber and the lower compartment communicating with the explosion chamber, the piston carrying a piston rod abutting upon and revoluble around a series of non-revoluble connected cam run-ways, capable of receiving a movement perpendicular to the axis of the piston rod, and a lever the movement of which brings the piston rods into alinement with a cam run-way around which they revolve to cause a reciprocating movement of the pistons, the movement of the lever simultaneously causing the operation of exhaust valves in the explosion chambers and the exploding of gas in the explosion chambers at predetermined positions of the pistons within the cylinders.

29. An internal combustion engine comprising a plurality of radially disposed cylinders fixedly attached to a revoluble power shaft, each cylinder containing a reciprocating piston carrying a piston rod which abuts upon and is rotatable upon a series of connected non-revoluble cam run-ways surrounding the cylinders said cam-way being capable of a movement transverse to the path of the revoluble piston rods, means whereby the rotation of the cylinders within the cam run-ways is caused by the explosion of gas within an explosion chamber situated between the inner head of the piston and the shaft, the reciprocating movement of the pistons being caused by the passage of the piston rod around the cam run-way.

30. An internal combustion engine comprising a plurality of radially disposed cylinders fixedly attached to a revoluble power shaft, each cylinder containing a reciprocating piston carrying a piston rod which abuts upon and is rotatable upon a series of connected non-revoluble cam run-ways surrounding the cylinders, means whereby the rotation of the cylinders within the cam run-ways is caused by the explosion of gas within an explosion chamber situated between the inner head of the piston and the shaft, the reciprocating movement of the pistons being caused by the passage of the piston rod around the cam run-way, and means whereby the piston rods may be shifted from one cam run-way to another, by a transverse movement of the cam run-ways.

31. An internal combustion engine comprising a plurality of radially disposed cylinders fixedly attached to a revoluble power shaft, each cylinder containing a reciprocating piston carrying a piston rod which abuts upon and is rotatable upon a series of connected non-revoluble cam run-ways surrounding the cylinders, means whereby the rotation of the cylinders within the cam run-ways is caused by the explosion of gas within an explosion chamber situated between the inner head of the piston and the shaft, the reciprocating movement of the pistons being caused by the passage of the piston rod around the cam run-way, means whereby the piston rods may be shifted from one cam run-way to another by a transverse movement of the cam run-ways and means for operating exhaust valves in the explosion chambers and causing an explosion of gas in the explosion chambers to revolve the cylinders and power shaft.

32. An internal combustion engine comprising a plurality of radially disposed cylinders fixedly attached to a revoluble power shaft, each cylinder containing a reciprocating piston carrying a piston rod which abuts upon and is rotatable upon a series of connected non-revoluble shiftable cam run-ways surrounding the cylinders, means whereby the rotation of the cylinders within the cam run-ways is caused by the explosion of gas within an explosion chamber, situated between the inner head of the piston and the shaft, the reciprocating movement of the pistons being caused by the passage of the piston rod around the cam run-way, and means for synchronizing the shifting of the cam run-ways with the operation of exhaust valves in the explosion chambers, and the exploding of gas in the explosion chambers at predetermined positions of the pistons within the cylinders to cause a revolution of the power shaft.

33. An internal combustion engine comprising a plurality of radially disposed cylinders fixedly attached to a revoluble power shaft, each cylinder containing a reciprocating piston carrying a piston rod which abuts upon and is rotatable upon a series of connected non-revoluble cam run-ways surrounding the cylinders said cam-way being capable of a movement transverse to the path of the revoluble piston rods, means whereby the rotation of the cylinders within the cam run-ways is caused by the explosion of gas within an explosion chamber situated between the inner head of the piston and the shaft, the reciprocating movement of the pistons being caused by the passage of the piston rod around the cam run-way, means for automatically introducing gas into chambers behind the pistons and automatically transferring gas from behind the piston into the explosion chambers by the movements of the pistons and means for operating an exhaust valve and for exploding gas in the explosion chamber to cause a revolution of the power shaft.

34. An internal combustion engine comprising a plurality of radially disposed cylinders fixedly attached to a revoluble power shaft, each cylinder containing a reciprocating piston carrying a piston rod which abuts upon and is rotatable upon a series of connected non-revoluble cam run-ways surrounding the cylinders, means whereby the rotation of the cylinders within the cam runways is caused by the explosion of gas within an explosion chamber situated between the inner head of the piston and the shaft, the reciprocating movement of the pistons being caused by the passage of the piston rod around the cam run-way, means for automatically introducing gas into chambers behind the pistons and automatically transferring gas from behind the piston into the explosion chambers by the movements of the pistons, and means for simultaneously shifting the cam run-ways, operating exhaust valves and exploding gas in the explosion chambers to cause a revolution of the power shaft.

35. In an internal combustion engine, a plurality of radially disposed cylinders fixedly attached to a revoluble power shaft, means for revolving the cylinders around the axis of the power shaft by the explosion of gas within the cylinders, a reciprocating movement being given the pistons by a series of non-revoluble connected cam run-ways encircling the cylinders against which the pistons are abutted by piston rods said camway being capable of a movement transverse to the path of the revoluble piston rods.

36. In an internal combustion engine, a plurality of radially disposed cylinders fixedly attached to a revoluble power shaft, means for revolving the cylinders around the axis of the power shaft by the explosion of gas within the cylinders, a reciprocating movement being given the pistons by a series of non-revoluble connected cam run-ways encircling the cylinders against which the pistons are abutted by piston rods, and means for transferring the path of the revolving cylinders from one cam run-way to another by a transverse movement of the cam run-ways.

37. In an internal combustion engine, a plurality of radially disposed cylinders fixedly attached to a revoluble power shaft, means for revolving the cylinders around the axis of the power shaft by the explosion of gas within the cylinders, a reciprocating movement being given the pistons by a series of non-revoluble connected cam run-ways encircling the cylinders against which the pistons are abutted by piston rods, and means for simultaneously transferring the path of the revolving cylinders from one cam run-way to another by a transverse movement of the cam run-ways, operating exhaust valves and exploding the gas at predetermined positions of the pistons within the cylinders.

38. In an internal combustion engine, a plurality of radially disposed cylinders fixedly attached to a revoluble power shaft, means for revolving the cylinders around the axis of the power shaft by the explosion of gas within the cylinders, a reciprocating movement being given the pistons by a series of non-revoluble connected cam run-ways encircling the cylinders against which the pistons are abutted by piston rods, means for automatically introducing gas into chambers behind the pistons and automatically transferring gas from behind the pistons into the explosion chamber by the movements of the pistons and means for simultaneously transferring the path of the revolving cylinders from one cam run-way to another by a transverse movement of the cam run-ways, operating exhaust valves and exploding the gas at predetermined positions of the pistons within the cylinders.

GUISEPPE JOSEPH BAUMSTARK.

Witnesses:
MARGARET R. FORDE,
D. F. MACDONALD.